Patented Nov. 18, 1924.

1,515,980

UNITED STATES PATENT OFFICE.

CECIL BRUCE WALROND, OF AUCKLAND, NEW ZEALAND.

LACE FOR BOOTS, SHOES, AND OTHER ARTICLES.

Application filed January 29, 1923. Serial No. 615,689.

*To all whom it may concern:*

Be it known that I, CECIL BRUCE WALROND, a citizen of the Dominion of New Zealand, residing at 24 Albany Road, Ponsonby, Auckland, in the Provincial District of Auckland, have invented certain new and useful Improvements in Laces for Boots, Shoes, and Other Articles, of which the following is a specification.

This invention relates to laces used in connection with boots, shoes and other articles, and has for its object the provision of an improvement whereby the ends of said laces will retain their efficiency for a longer period than when equipped with the ordinary metal tags, besides eliminating the discomfort which very often arises from the use of metal tags.

The invention consists in stiffening and pointing the ends of the laces to a degree that will enable them to be inserted without trouble in the holes through which the laces are to be passed by the use of rubber solution which when solid is flexible and will not break or peel off the ends of the laces when the latter are in use.

This is done by dipping the opened out lace ends in the rubber solution and then doubling or rolling the solution coated portions upon themselves lengthways of the laces before the solution solidifies.

The result that the lace ends are given a pointed formation the solution adhering to said ends causing the latter to maintain their rolled or doubled formations.

The rubber solution when solid stiffens the lace ends sufficiently to enable them to be inserted in holes, without trouble and at the same time leaves them in such a state that they may be bent and tucked inside boots, shoes and garments without causing discomfort to the wearer.

The lace ends being of porous material are impregnated with the solution and serve as a reinforcement for the latter.

The solution treated portions can be vulcanized to render them more durable.

The invention will be further described in conjunction with the accompanying drawing wherein:—

The end of a lace 1 while opened out is dipped into rubber solution which on cooling and solidifying will be flexible, and will not break or peel off the lace.

Figure 1:
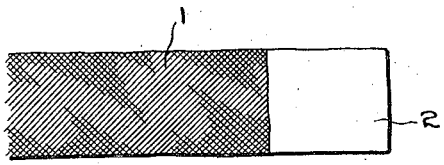
Figure 1 illustrates a lace end (opened out) and after having been dipped in rubber solution.
Figure 2:
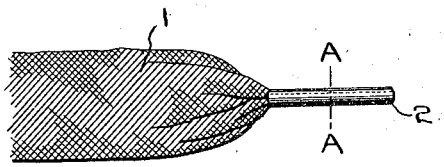
Figure 2 shows the solution treated portion rolled or doubled to produce a pointed lace end.
Figure 3:
Figure 3 is an exaggerated cross sectional view taken on the line A—A, Figure 2.

Before the rubber solution adhering to the lace as at 2, has had time to cool and solidify, the solution treated portion of said lace is rolled or doubled upon itself, and lengthways of the lace, to give the end of the latter an approximately pointed formation as shown in Figure 2.

The solution is then allowed to cool off and solidify, the adhesive properties of said solution, causing the lace end to retain its rolled or doubled formation with the result that the lace is provided with an approximately pointed end rendered stiff enough to enable it to be inserted in a hole without trouble, and having a degree of flexibility and softness, not likely to cause discomfort when tucked or stowed inside a boot or garment worn on the person.

As laces are made of porous material, they become impregnated at the ends with the solution, the fabrics of the lace serving as a reinforcement to the solution. If desired the whole lace can be impregnated or treated with rubber solution, the ends only being rolled or doubled as before described. Also the solution treated portions can be vulcanized to render them more durable.

What I do claim and desire to obtain by Letters Patent of the United States of America is:—

A method for making laces, comprising impregnating an entire fabric lace with a rubber solution, longitudinally doubling over, and rolling, the ends only of the lace, before the rubber solution has set, and subsequently vulcanizing the said rolled ends.

In testimony whereof I have signed my name to this specification.

CECIL BRUCE WALROND.

Witnesses:
 WILLIAM PINCHES,
 MARY PILKINGTON.